(12) United States Patent
Chen et al.

(10) Patent No.: US 10,557,985 B2
(45) Date of Patent: Feb. 11, 2020

(54) BACKLIGHT ASSEMBLY AND DISPLAY APPARATUS (71) Applicants: BOE TECHNOLOGY GROUP CO., LTD., Beijing (CN); BOE OPTICAL SCIENCE AND TECHNOLOGY CO., LTD., Suzhou (CN)

(72) Inventors: Huafeng Chen, Beijing (CN); Chunming Wu, Beijing (CN)

(73) Assignees: BOE TECHNOLOGY GROUP CO., LTD., Beijing (CN); BOE OPTICAL SCIENCE AND TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 15/324,696

(22) PCT Filed: May 20, 2016

(86) PCT No.: PCT/CN2016/082900
§ 371 (c)(1),
(2) Date: Jan. 7, 2017

(87) PCT Pub. No.: WO2017/075968
PCT Pub. Date: May 11, 2017

(65) Prior Publication Data
US 2018/0231709 A1 Aug. 16, 2018

(30) Foreign Application Priority Data
Nov. 5, 2015 (CN) .................. 2015 2 0876963 U (51) Int. Cl.
F21V 8/00 (2006.01)
G02F 1/1333 (2006.01)
G02F 1/1335 (2006.01)

(52) U.S. Cl.
CPC ..... *G02B 6/0073* (2013.01); *G02F 1/133308* (2013.01); *G02F 1/133603* (2013.01);
(Continued)

(58) Field of Classification Search
None
See application file for complete search history.

(56) References Cited

U.S. PATENT DOCUMENTS 6,392,724 B2 * 5/2002 An .................. G02B 6/0088
349/58
8,558,963 B2 10/2013 Li
(Continued)

FOREIGN PATENT DOCUMENTS

CN 200972512 Y 11/2007

OTHER PUBLICATIONS

International Search Report and Written Opinion dated Aug. 31, 2016 in PCT/CN2016/082900.
(Continued)

*Primary Examiner* — Elmito Breval
(74) *Attorney, Agent, or Firm* — Syncoda LLC; Feng Ma (57) ABSTRACT

A backlight assembly includes: a frame with at least one support bar configured to support a display panel; a light guide plate with at least one support portion protruding from at least one side of the light guide plate; and a film assembly including an optical film between the at least one support bar and the light guide plate, wherein the optical film is provided with at least one flange protruding from at least one side of the optical film assembly and over the at least one support portion on a surface of the at least one support portion facing the at least one support bar.

20 Claims, 5 Drawing Sheets

(52) U.S. Cl.
CPC .... *G02F 1/133615* (2013.01); *G02F 2201/46* (2013.01); *G02F 2202/28* (2013.01)

(56) References Cited

U.S. PATENT DOCUMENTS

| | | | |
|---|---|---|---|
| 2006/0147175 A1 | 7/2006 | Shinohara | |
| 2009/0147174 A1* | 6/2009 | Ha | G02F 1/133606 349/58 |
| 2013/0027635 A1 | 1/2013 | Urano et al. | |
| 2013/0169886 A1* | 7/2013 | Kuromizu | G02B 6/0088 348/739 |
| 2014/0192554 A1* | 7/2014 | Tomomasa | G02B 6/0088 362/606 |
| 2014/0226073 A1* | 8/2014 | Kamada | G02F 1/133512 348/725 |
| 2016/0341885 A1* | 11/2016 | Xie | G02F 1/133608 |

OTHER PUBLICATIONS

Supplemental European Search Report dated Apr. 8, 2019 in EP 16816167.7.

\* cited by examiner

BACKLIGHT ASSEMBLY AND DISPLAY APPARATUS

CROSS-REFERENCE TO RELATED APPLICATION

The present application claims priority to Chinese Patent Application No. 201520876963.8 filed on Nov. 5, 2015, the disclosure of which is hereby incorporated by reference in its entirety.

TECHNICAL FIELD

The present disclosure relates generally to display technologies, and more specifically to a backlight assembly and a display apparatus.

BACKGROUND

In many applications, a relatively flat structure, such as a panel, a diaphragm, etc., may need to be securely fixed onto other structures. For example, a liquid crystal display (LCD) apparatus may need a backlight module to provide light to the liquid crystals for modulation. A typical backlight module may include a light source, such as a light-emitting diode (LED) light source, a light guide plate to guide the light from the light source, and an optical film assembly configured to diffuse the light. With the continuous advancement of the LCD technologies, the LED backlight module is moving towards the direction of narrower bezels, which may make it more difficult to secure the backlight module. This may become a more prominent issue in vehicle onboard display applications, where a more stable structure of the backlight module may be needed.

In a first mounting method, the optical film assembly is arranged above the frame in the backlight module. In a second mounting method, the optical film assembly is disposed below the frame in the backlight module.

In existing technologies, as a result of the methods of mounting the optical film in the backlight module, the distance from an edge of an effective display area of the display apparatus to an edge of the light guide plate can be relatively small. As such, shadowing and uneven lighting can occur near mounting brackets of the backlight module. Therefore, it may be difficult to design the display apparatus with narrow bezels using the conventional mounting methods.

SUMMARY

In an aspect, a backlight assembly is provided including: a frame with at least one support bar configured to support a display panel; a light guide plate with at least one support portion protruding from at least one side of the light guide plate; and a film assembly comprising an optical film between the at least one support bar and the light guide plate, wherein the optical film is provided with at least one flange protruding from at least one side of the optical film assembly and over the at least one support portion on a surface of the at least one support portion facing the at least one support bar.

In some embodiments, the backlight assembly further comprises: a backplane with a bottom plate and at least one side plate surrounding the bottom plate; wherein each of the at least one side plate of the backplane comprises at least one slot configured to hold the at least one support portion and the at least one flange.

In some embodiments, the at least one slot has a shape configured to fit with the at least one flange and the at least one support portion.

In some embodiments, the shape of the at least one slot is rectangular.

In some embodiments, the at least one flange of the optical film is over the at least one support portion via at least one shading tape.

In some embodiments, wherein each flange corresponds to one support portion.

In some embodiments, a surface area of the support portion is no less than a surface area of the flange.

In some embodiments, the surface area of the support portion equals the surface area of the flange.

In some embodiments, the at least one flange and the at least one support portion both have a substantially same shape.

In some embodiments, the shape is one of rectangle, square, semicircle, or trapezoid.

In some embodiments, the at least one support portion of the light guide plate is evenly spaced along each of the at least one side of the light guide plate.

In some embodiments, the backplane has a U-shaped cross section; and the at least one support portion is over the at least one side plate of the backplane at an end surface facing the at least one support bar.

In some embodiments, a side surface of a protruding end of the at least one support portion is aligned with an outer wall of the at least one side plate of the backplane.

In some embodiments, the at least one support portion is mounted over the at least one side plate of the backplane via adhesive bonding.

In some embodiments, the backplane and the frame are coupled via adhesive bonding.

In some embodiments, the backplane and the frame are coupled via a double-sided adhesive tape.

In some embodiments, the backplane and the frame are coupled via snap-fit connection.

In some embodiments, the backplane and the frame are integrally formed.

In some embodiments, the frame is formed by injection molding on the backplane.

In another aspect, a display apparatus is provided, comprising the abovementioned backlight assembly.

Other embodiments and implementations may become apparent in view of the following descriptions and the attached drawings.

BRIEF DESCRIPTION OF THE DRAWINGS

To more clearly illustrate some of the embodiments, the following is a brief description of the drawings. The drawings in the following descriptions are only illustrative of some embodiments. For those of ordinary skill in the art, without the premise of inventive efforts, other drawings of other embodiments can become apparent based on these drawings.

DETAILED DESCRIPTION

In the following, with reference to the drawings of various embodiments disclosed herein, the technical solutions of the embodiments of the disclosure will be described in a clear and fully understandable way. It is obvious that the described embodiments are merely a portion but not all of the embodiments of the disclosure. Based on the described embodiments of the disclosure, those ordinarily skilled in the art can obtain other embodiment(s), which come(s) within the scope sought for protection by the disclosure.

In a conventional backlight module, the relatively short distance between the edge of the light guide plate and the edge of the effective display area can result in issues such as shadowing and uneven lighting near the regions of mounting brackets. Dark stripes and bright spots may appear as a result. The conventional structure also makes it difficult to achieve narrow-border designs for the display apparatus.

Figure 1:
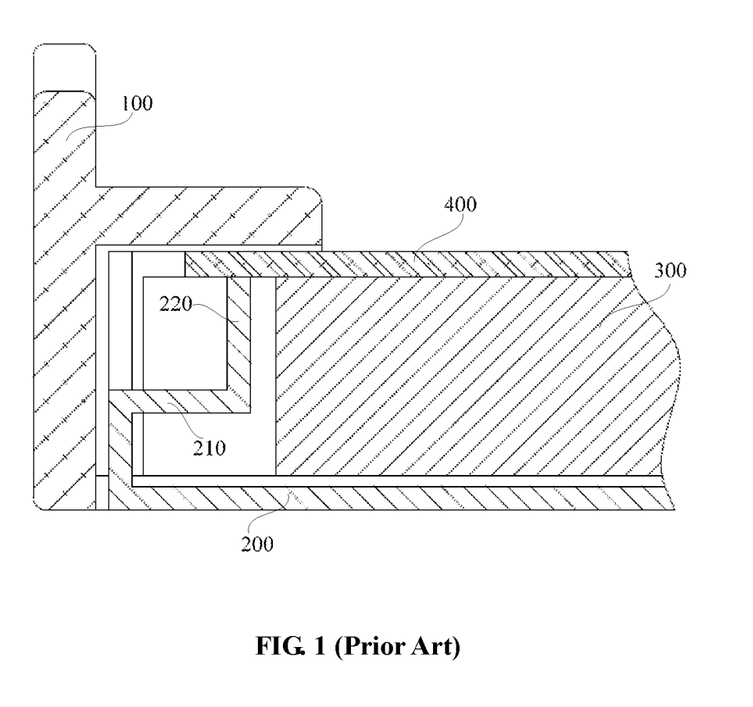
FIG. 1 is a schematic diagram of a conventional backlight module with an optical film mounted under a frame.

FIG. 1 illustrates a conventional backlight module with an optical film assembly 400 mounted under a frame 100. In this configuration, the frame 100 fastens a light guide plate 300 and the optical film assembly 400 underneath, and supports the display panel above the light guide plate 300.

A backplane 200 is provided with a mounting bracket 220 on its sidewall, for mounting and positioning the film assembly 400. To support the mounting bracket 220, a backplane 200 is provided with a step 210. In order to make room for the step 210 and the mounting bracket 220 arranged on the backplane 200, the edge of light guide plate 300 needs to be close to the edge of the effective display area of the display apparatus. This can result in shadowing and uneven lighting near the regions of mounting brackets of the fixing structure, and make it difficult to achieve narrow-border designs for the display apparatus.

To overcome at least some of the drawbacks in existing technologies, the present disclosure provides a backlight assembly including a fixing structure, and a display apparatus containing the backlight assembly. In the fixing structure, the film assembly is mounted via the light guide plate, which can alleviate the problems shadowing and uneven lighting, reduce the width of the support bar on the frame, and facilitate narrow-boarder designs for the display apparatus.

Refer to FIGS. 2-5 for a fixing structure according to some embodiments of the disclosure. The fixing structure comprises a frame 1, a backplane 2, a light guide plate 3, and a film assembly 4. In some embodiments, the film assembly comprises an optical film or an optical diaphragm, for example when the fixing structure is configured as a backlight assembly of a display apparatus. The backlight assembly may also be referred to as a backlight module. The backlight assembly can have a modular structure, or can comprise a plurality of components. The backlight assembly can also be provided as a kit including different components.

The frame 1 can be provided with at least one support bar 11, configured to provide support to a display panel. The film assembly 4 is disposed between the at least one support bar 11 and the light guide plate 3, and at least one flange 41 is arranged on at least one side of the film assembly 4.

In some embodiments, the fixing structure can be configured in a modular fashion and include different components. For example, the structure can be used as a backlight module for a display apparatus. In some embodiments, the structure can be used in other applications, such as securing a panel and providing mechanical support to the panel. The panel can be an electronic device, a piece of painting, or any other delicate structure that can be assembled and secured according to various embodiments disclosed herein.

In some embodiments, the frame can be a mold frame, a plastic frame, or other frames known to those of ordinary skills in the art. In some embodiments, the flange 41 can be a rim, a protrusion, or have other shapes.

The light guide plate 3 can be provided with at least one support portion 31.

The at least one flange 41 of the film assembly 4 can be mounted on the at least one support portion 31 of the light guide plate 3 on a side facing the support bar 11 of the frame 1.

As a result of the mounting of the flange 41 of the film assembly 4 on the support portion 31 of the light guide plate 3, the film assembly 4 can be mounted via the light guide plate 3. This configuration substantially eliminates the need for arranging mounting brackets and steps on the sidewall of the backplane, thereby reducing the distance from the light guide plate 3 and the film assembly 4 to the sidewall of the frame 1, allowing for a closer arrangement of the light guide plate 3 and the film assembly 4 to the sidewall of the frame 1.

As such, the support bar 11 on the frame 1 can be configured to have a relatively small width in its shadowing of the edge of light guide plate 3, which can reduce or eliminate the problems of shadowing and uneven lighting. In addition, reduction of the width (shown as "A" in FIGS. 2 and 4) of the support bar 11 of the frame 1 helps to achieve narrow-border designs for display apparatuses.

Figure 2:
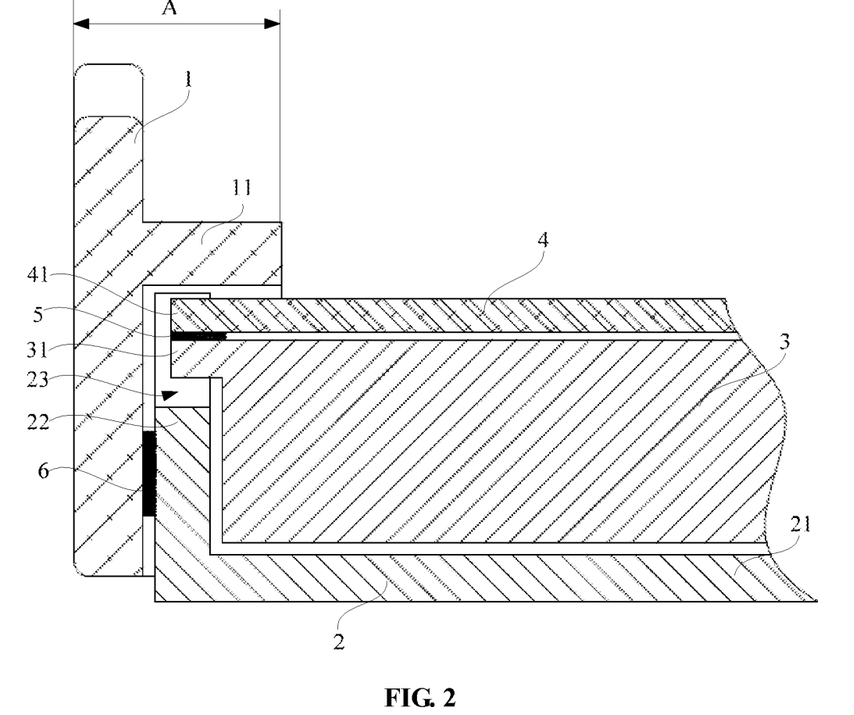
FIG. 2 is a schematic diagram of a structure of part of a backlight assembly according to some embodiments.
Figure 4:
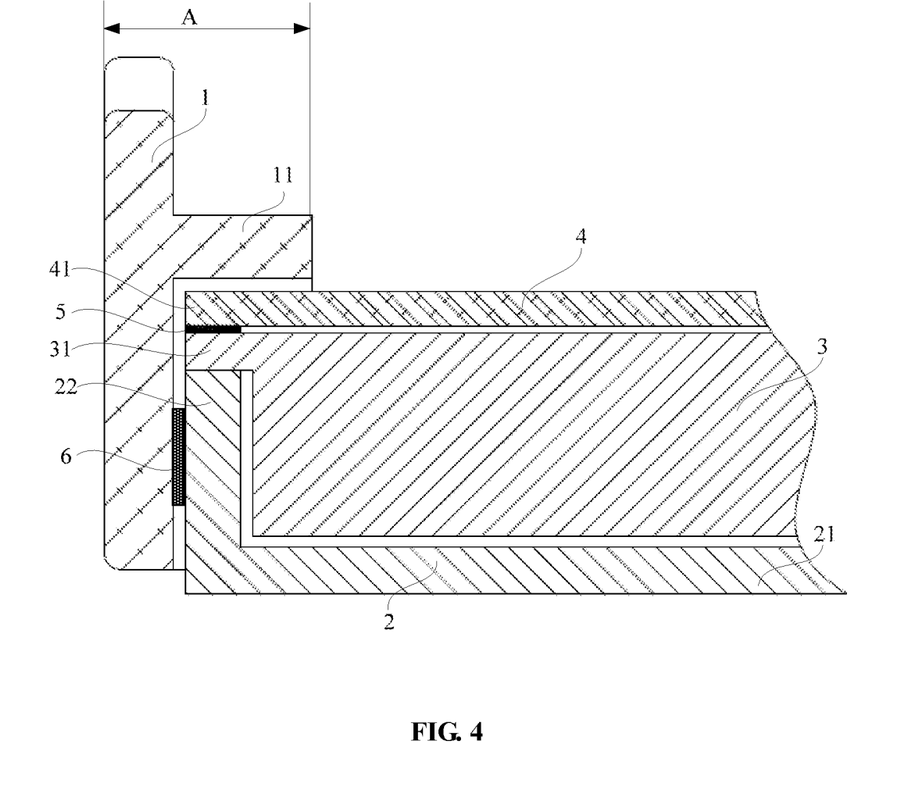
FIG. 4 is a schematic diagram of amounting structure of the optical film in a backlight assembly according to some other embodiments.

In some embodiments, as shown in FIGS. 2 and 4, the at least one flange 41 of the film assembly 4 is attached via at least one shading tape 5 to the at least one support portion 31 of the light guide plate 3 on a side facing the support bar 11.

In some embodiments, the flange 41 and the support portion 31 can both be shaped as rectangle, square, semi-circle, or trapezoid, and can be configured to have the same shape, to facilitate mounting the at least one flange 41 of the film assembly 4 with the at least one support portion 31 of the light guide plate 3.

In some embodiments, the film assembly 4 can be provided with a plurality of flanges 41. The light guide plate 3 can be provided with a plurality of support portions 31. The plurality of flanges 41 and the plurality of support portions 31 can have a one-to-one correspondence. For example, each flange 41 corresponds to one support portion 31, and each support portion 31 corresponds to one flange 41. The plurality of support portions 31 of the light guide plate 3 and the plurality of flanges 41 of the film assembly 4 can be coupled in one-to-one connections.

For each connection between one support portion 31 and one flange 41, the support portion 31 can be configured to have a support surface having an area greater than, or equal to, an area of a matching surface of the flange 41, allowing for a sufficiently strong coupling between the matching surface of the flange 41 and the support surface of the support portion 31.

In some embodiments, the film assembly 4 can have all four sides as mounting sides. In some other embodiments, the film assembly 4 can have a pair of opposite sides as mounting sides.

Figure 3:
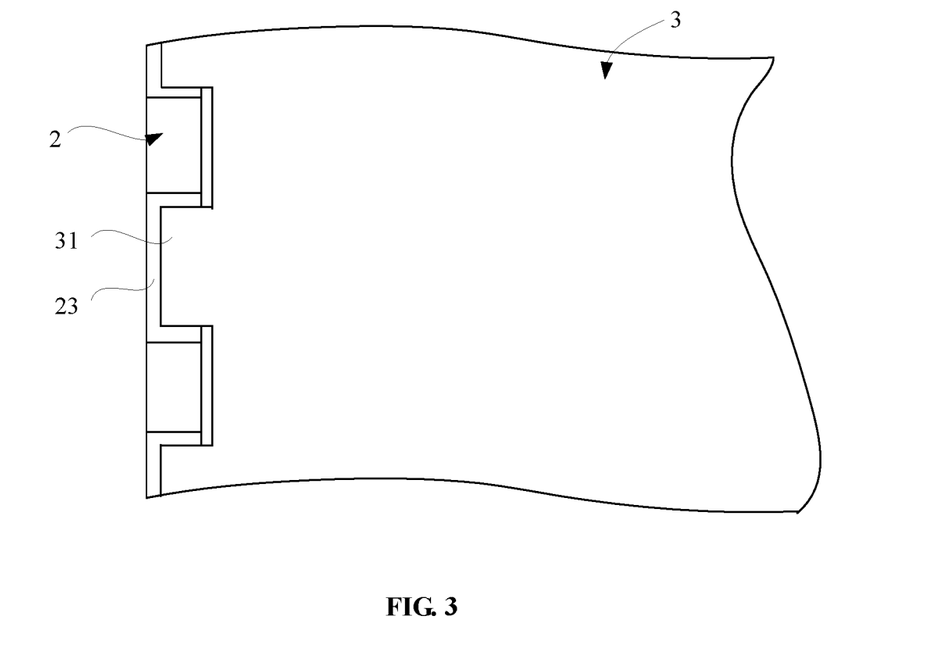
FIG. 3 is a schematic diagram of a coupling between support portions of the light guide plate and the side plate of the backplane in the backlight assembly of FIG. 2.
Figure 5:
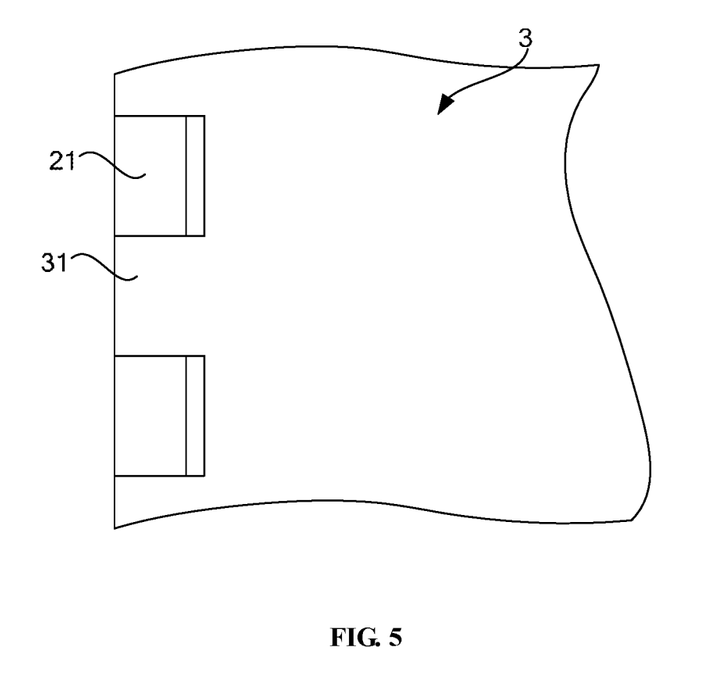
FIG. 5 is a schematic diagram of the coupling of between the support portions of the light guide plate and the side plate of the backplane in the backlight assembly of FIG. 4.

In some embodiments, as shown in FIG. 3 and FIG. 5, the plurality of support portion 31 that correspond to each mounting side of the film assembly 4 can be evenly spaced along the mounting side.

In some embodiments, as shown in FIG. 2 and FIG. 4, the fixing structure is configured as part of a backlight assembly of a display apparatus. The backlight assembly comprises a frame 1, a backplane 2, a light guide plate 3, and a film assembly including the optical film 4. The frame 1 is provided with at least one support bar 11, configured to provide support to a display panel. The optical film 4 is disposed between the at least one support bar 11 and the light guide plate 3.

At least one flange 41 is arranged on at least one side of the optical film 4. The light guide plate 3 is provided with at least one support portion 31. The at least one flange 41 of the optical film 4 is mounted on the at least one support portion 31 of the light guide plate 3 on a side facing the support bar 11 of the frame 1. The backplane 2 comprises a bottom plate 21 and at least one side plate 22 which surrounds the bottom plate 21, and the backplane 2 has a "U"-shaped cross section.

In some embodiments, as shown in FIG. 4, each of the at least one support portion 31 is disposed over the end surface of the side plate 22 of the backplane 2 that corresponds to the support portion 31, and the support portion 31 and the side plate 22 can be connected via adhesive bonding.

In some embodiments, as shown in FIG. 4 and FIG. 5, the protruding end of each of the at least one support portion 31 is configured to align with the outer wall of the side plate 22 of the backplane 2.

In some embodiments, as shown in FIG. 2 and FIG. 3, the side plate 22 of the backplane 2 can be provided with at least one slot 23 corresponding to the at least one support portion 31. Each slot 23 can correspond to one support portion 31, and each support portion 31 can correspond to one slot 23.

A protruding end of each of the at least one support portion 31 of the light guide plate 3, as well as each of the at least one flange 41 of the optical film 4, extends into each of the at least one slot 23 on the side plate 22 of the backplane 2.

Such a configuration can simplify installation and mounting of the light guide plate 3, and constrain or limit movement of the light guide plate 3 and the optical film 4, thereby facilitating speed and efficiency of the assembly process.

In some embodiments, to facilitate the extension of the at least one support portion 31 and the at least one flange 41 into the at least one slots 23 in a corresponding manner, the at least one slot 23 can be arranged to have a rectangular shape that is fit with the at least one flange 41 and the at least one support portion 31.

In some embodiments, the frame 1 and the backplane 2 in the backlight assembly as described above can be connected by bonding, as shown in FIG. 2 and FIG. 4, where the side plate 22 of the backplane 2 and the frame 1 can be bonded with a double-sided adhesive tape 6. In some other embodiments, the backplane 2 and the frame 1 can be coupled via a snap-fit connection. The backplane 2 and the frame 1 can also be integrally formed to be a one-piece structure; for example, after the backplane 2 is manufactured, the frame 1 can be formed integrally by injection molding on the backplane 2.

It should be noted that the various structural shapes, sizes, etc. described above in the various embodiments of the disclosure are only schematic and illustrative of the structures, and should not to be interpreted as limitations. In practice, deviations introduced during manufacturing are within the scope of protection of this disclosure. For example, the rectangular, square, semi-circular, or trapezoidal shapes can have rounded corners, and can have variations in the lengths of sides and in their respective ratios. In some embodiments, the fixing structure or the backlight assembly can be provided as a kit of components, to be assembled into the backlight assembly, and the display apparatus.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A backlight assembly, comprising:
   a frame with at least one support bar configured to support a display panel;
   a light guide plate with at least one support portion protruding from at least one side of the light guide plate; and
   a film assembly comprising an optical film between the at least one support bar and the light guide plate, wherein the optical film is provided with at least one flange protruding from at least one side of the optical film assembly and over the at least one support portion of the light guide plate on a surface of the at least one support portion of the light guide plate facing the at least one support bar;
   wherein the at least one flange has a side aligned with a side of the at least one support portion; and
   wherein the at least one support bar is integrally formed with the frame.

2. The backlight assembly of claim 1, further comprising:
   a backplane with a bottom plate and at least one side plate surrounding the bottom plate;
   wherein each of the at least one side plate of the backplane comprises at least one slot configured to hold the at least one support portion and the at least one flange.

3. The backlight assembly of claim 2, wherein:
   the backplane has a U-shaped cross section; and
   the at least one support portion is over the at least one side plate of the backplane at an end surface facing the at least one support bar.

4. The backlight assembly of claim 3, wherein a side surface of a protruding end of the at least one support portion is aligned with an outer wall of the at least one side plate of the backplane.

5. The backlight assembly of claim 4, wherein the at least one support portion is mounted over the at least one side plate of the backplane via adhesive bonding.

6. The backlight assembly of claim 2, wherein the backplane and the frame are coupled via adhesive bonding.

7. The backlight assembly of claim 6, wherein the backplane and the frame are coupled via a double-sided adhesive tape.

8. The backlight assembly of claim 2, wherein the backplane and the frame are coupled via snap-fit connection.

9. The backlight assembly of claim 2, wherein the backplane and the frame are integrally formed.

10. The backlight assembly of claim 9, wherein the frame is formed by injection molding on the backplane.

11. The backlight assembly of claim 2, wherein the at least one slot has a shape configured to fit with the at least one flange and the at least one support portion.

12. The backlight assembly of claim 11, wherein the shape of the at least one slot is rectangular.

13. The backlight assembly of claim 1, wherein the at least one flange of the optical film is over the at least one support portion via at least one shading tape.

14. The backlight assembly of claim 1, wherein each flange corresponds to one support portion of the light guide plate, and has a side aligned with a side of the corresponding support portion.

15. The backlight assembly of claim 1, wherein a surface area of the support portion is no less than a surface area of the flange.

16. The backlight assembly of claim 15, wherein the surface area of the support portion equals the surface area of the flange.

17. The backlight assembly of claim 1, wherein the at least one flange and the at least one support portion both have a substantially same shape.

18. The backlight assembly of claim 17, wherein the shape is one of rectangle, square, semicircle, or trapezoid.

19. The backlight assembly of claim 1, wherein the at least one support portion of the light guide plate is evenly spaced along each of the at least one side of the light guide plate.

20. A display apparatus, comprising a backlight assembly, wherein the backlight assembly comprises:
- a frame with at least one support bar configured to support a display panel;
- a light guide plate with at least one support portion protruding from at least one side of the light guide plate; and
- a film assembly comprising an optical film between the at least one support bar and the light guide plate, wherein the optical film is provided with at least one flange protruding from at least one side of the optical film assembly and over the at least one support portion of the light guide plate on a surface of the at least one support portion of the light guide plate facing the at least one support bar;
- wherein the at least one flange has a side aligned with a side of the at least one support portion; and
- wherein the at least one support bar is integrally formed with the frame.

* * * * *